US006299719B1

(12) United States Patent
Traband et al.

(10) Patent No.: US 6,299,719 B1
(45) Date of Patent: Oct. 9, 2001

(54) METHOD FOR THE MAKING OF A SECURED DOCUMENT AND SECURED DOCUMENT OBTAINED BY THIS METHOD

(75) Inventors: Paul Traband, Puteaux; Pierre Corbobesse, Boussy Saint Antoine; Claude Bricot, Villejuif, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/203,579

(22) Filed: Dec. 2, 1998

(30) Foreign Application Priority Data

Dec. 2, 1997 (FR) .................................................. 97 15141

(51) Int. Cl.$^{7}$ ............................ B44C 1/16; B32B 31/20; B32B 7/06; B32B 7/12; B41M 3/12

(52) U.S. Cl. .......................... 156/241; 156/230; 156/240; 156/247; 156/277; 156/289; 427/146; 427/147; 427/148; 428/195; 428/200; 428/202; 428/352; 428/914; 428/915

(58) Field of Search .................................... 156/230, 233, 156/234, 239, 240, 241, 247, 277, 289; 427/146, 147, 148; 428/195, 914, 915, 47.1, 41.8, 46, 200, 202, 203, 343, 352

(56) References Cited

U.S. PATENT DOCUMENTS 5,158,818 * 10/1992 Aurichio ................................ 428/40
5,566,982 10/1996 Lehureau et al. .
5,820,971 * 10/1998 Kaule et al. ......................... 428/209
6,086,707 * 7/2000 Waller ................................. 156/277

FOREIGN PATENT DOCUMENTS 0 221 552 5/1987 (EP) .
0 407 615 1/1991 (EP) .
2 005 598 4/1979 (GB) .
95/06564 3/1995 (WO) .
98/15411 4/1998 (WO) .

* cited by examiner

*Primary Examiner*—Richard Crispino
*Assistant Examiner*—J. A. Lorengo
(74) *Attorney, Agent, or Firm*—Oblon, Spivak, McClelland, Maier & Neustadt, P.C.

(57) ABSTRACT

In a method for the making of a secured document, a layer of bonder is prepared on at least one face of the document; one or more information elements and/or images are printed on a first face of an information transfer sheet; the first face of the information transfer sheet is applied to the layer of bonder of said face of the document. In this way, the information elements are printed on a transfer sheet that has no layer of bonder and yet there are obtained information elements that get merged into the layer of bonder.

17 Claims, 3 Drawing Sheets

Figure 1A:
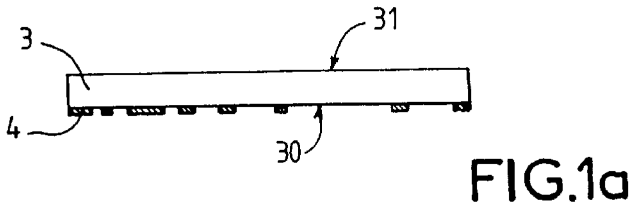

METHOD FOR THE MAKING OF A SECURED DOCUMENT AND SECURED DOCUMENT OBTAINED BY THIS METHOD

BACKGROUND OF THE INVENTION

The invention relates to a method for making a secured document and to a secured document obtained by this method. More specifically, the invention relates to the making of plasticized documents in which any attempt to remove the protective plastic cover leads to the destruction of the document.

The invention can be applied to the manufacture of passports, identity cards, badges, etc.

In the field of passports, for example, for personalizing a passport, there are known ways of using a transparent film comprising an adhesive face. This face receives the personalizing information elements by means of commercially available reproduction tools such as laser, ink-jet or thermal printers. The personalizing information is usually the identity of the individual, his or her address, personal particulars relating to birth, marital status etc., and his or her photograph. The information may also include fingerprints or any other information.

The transparent film bearing this information is placed in the passport booklet [2]facing the page planned for this purpose, with the adhesive face of the transparent film and, therefore, the information against the page of the passport. The film and the page of the passport are fixedly joined together by hot-pressing.

This technique leads to the printing of the information on a layer of bonder covering a face of the transparent sheet. There then arises a problem of the state of the surface of the layer of bonder. Furthermore, there is the risk of deformation of the information during the joining of the transparent sheet with the page of the passport during the melting of the bonder and during the bonding under pressure.

The invention makes it possible to resolve these problems.

SUMMARY OF THE INVENTION

The invention therefore relates to a method for the making of a secured document wherein:

- a layer of bonder is prepared on at least one face of the document;
- one or more information elements and/or images are printed on a first face of an information transfer sheet;
- the first face of the information transfer sheet is applied to the layer of bonder of said face of the document.

The invention therefore makes it necessary to provide the document to be secured with a layer of bonder. As a tradeoff, the printing of the personalizing information can be done on a transfer sheet that is free of any layer of bonder.

The invention also relates to a document comprising a carrier covered on one face with a layer of bonder that bears information elements, the entire unit being covered with a transparent security film.

SUMMARY OF THE INVENTION

The various objects and characteristics of the invention shall appear more clearly in the following description and in the appended figures, of which:

FIGS. 1*a* to 1*d* show an exemplary method of making the device according to the invention;

FIGS. 2*a* to 4 show improvements of the method of FIGS. 1 a to 1*d;*

FIGS. 5*a* to 5*g* show a alternative to the method of the invention.

MORE DETAILED DESCRIPTION

Referring to FIGS. 1*a* to 1*d*, a description shall be given first of all of an exemplary simplified embodiment of the method of the invention.

As shown in FIG. 1*a*, the personalizing information elements 4 that must be contained in the document to be obtained are printed on the face 30 of an information transfer sheet 3 such as a transparent film. Hereinafter, it shall be assumed by way of an example that the document is a passport. In this case, as indicated here above, the personalizing information elements are the identity, personal particulars relating to birth and marital status, address, photograph etc. of the future holder of the passport.

Figure 1B:
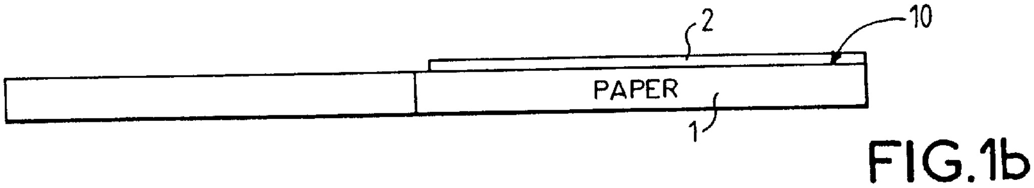
Figure 1C:
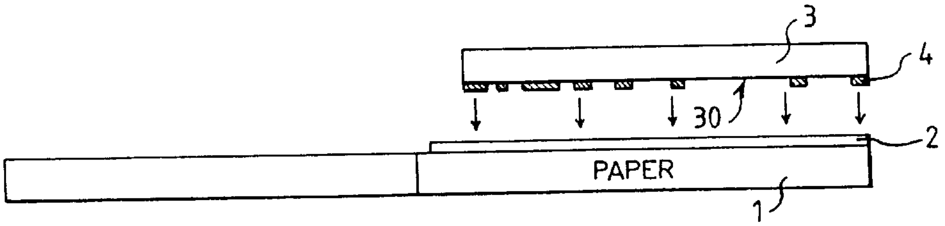

Furthermore, the face 10 of the page of the passport referenced 1 in the figures is coated with a layer of bonder 2 (FIG. 1*b*). This bonder coating operation can be done as part of the method of the invention or it can be done prior to the method.

The bonder may be a cold bonder or a bonder at ambient temperature and in this case, preferably, it is protected by a protective sheet not shown in FIG. 1*a*.

Then, the film 3 bearing the information elements 4 as shown in FIG. 1*a* is applied to the face 10 of the passport (FIG. 1*c*) with the information against the face 10.

Figure 1D:
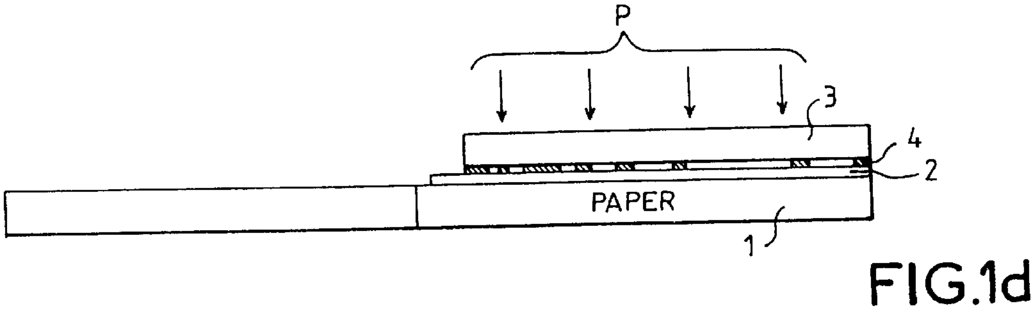

If the bonder 2 is a cold bonder, the film is applied under pressure P (FIG. 1*d*). This pressure is preferably uniform throughout its surface against the face 10 of the passport and is applied under heat (at a temperature of 60 to 130° C. for example about 100° C.) so that, after cooling, the film is bonded to the face 10. This operation will be done by making the passport pass under heat into a roller.

It must be noted that the face 10 may be covered with a layer of cold bonder by a silk-screen printing method:

If the bonder 2 is a bonder at ambient temperature, the protective sheet of this layer of bonder is removed (if this has been planned). The transparent film 3 is applied to the layer of bonder with the information 4 in contact with the layer of bonder, and slight pressure is applied uniformly on the surface of the transparent film as is usually done for the bonding of self-adhesive objects.

A document as shown in FIG. 1*d* is thus obtained. In this figure, the document 1 carries information elements 4 on its face 10. These information elements 4 are protected by the transparent film 3. Since the transparent film is fixedly joined to the bonder 2 and, since the information elements are trapped between the bonder and the film 3, it is clear that any attempt to remove the film in order to falsify the document for example would lead to the deterioration and even the destruction of the information elements and make the document unusable. Thus, the information transfer sheet 3 is used as a safety film for the document.

The film 3 may be made of PVC for example.

The hot bonder may be the copolymer vinyl acetate/ethylene, the copolymer acrylic acid/ethylene, polyethylene or the like. It must be noted that security information may be printed on the layer of bonder before the bonding of the film 3.

Figure 2A:
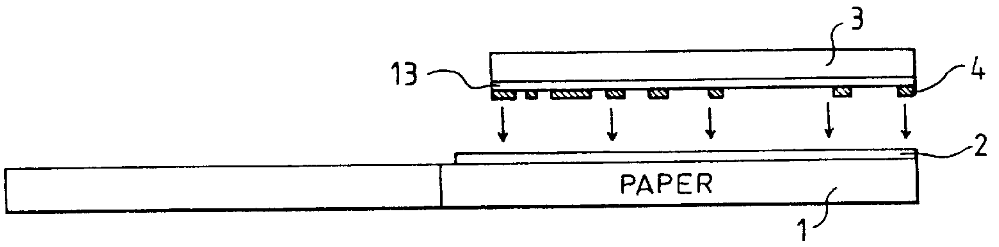
Figure 2B:
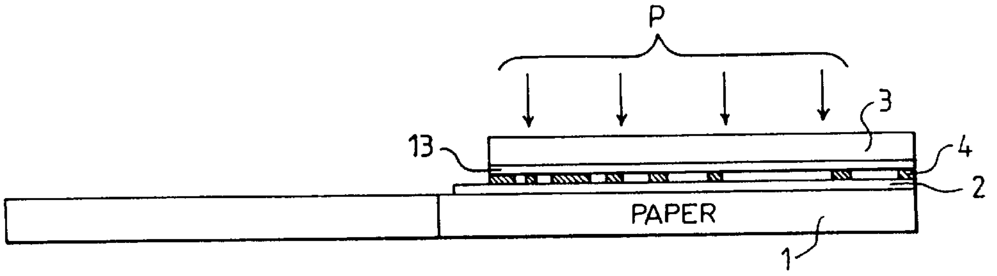

FIGS. 2*a* and 2*b* show the same method as that of FIGS. 1*a* to 1*d* but it has been furthermore provided to cover the face 30 of the film 3 with a layer of gelatin 13 before printing personalizing information 4. This gelatin is used as a receiving layer for the printing pigments and enables these pigments to be fixed to the face 30 of the film 3. After printing, the film 3 is applied to the face 10 of the document 1 with the information elements 4 in contact with the face 10 as described further above.

Figure 3:
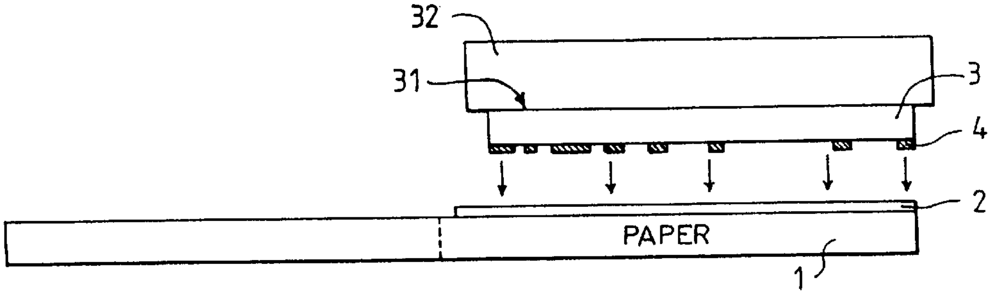

FIG. 3 shows the transparent film 3. This transparent film 3 has a backing sheet 32 attached to its face 31. This backing sheet 32 is used for the handling of the film 3. After the bonding of the film 3 to the document 1, the backing sheet 32 is withdrawn.

The backing sheet 32 may be made of plastic, polyester, PVC or polycarbonate.

Figure 4:
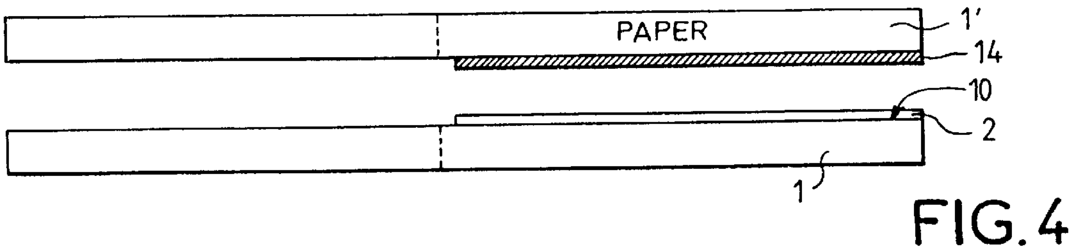

FIG. 4 is applicable more particularly to passports. Should the face 10 of page 1 of the passport be pre-coated by a layer of hot bonder, then in order to prevent the face 10 from getting stuck to the neighboring page 1' of the passport when it is closed during the storage of the passports, it is planned to coat this neighboring page 1' with an adhesive-proof layer such as a silicone layer 14.

FIGS. 5*a* to 5*g* show an alternative to the method of the invention.

Figure 5A:
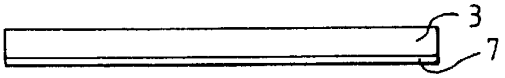

The information transfer sheet 3 is coated with an adhesive-proof layer 7 such as silicone (FIG. 5*a*).

Figure 5B:
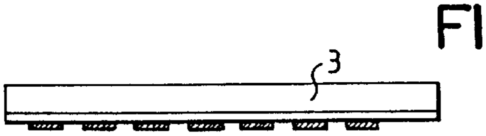
Figure 5C:
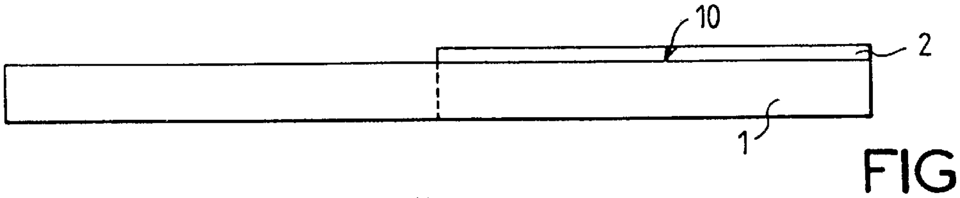

The personalizing information 4 is printed on this adhesive-proof layer (FIG. 5*b*).

Figure 5D:
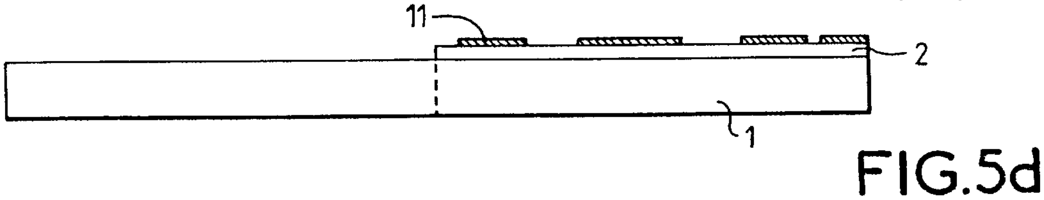

Furthermore, the face 10 of the document 1 (passport) is coated with a layer of bonder 2 (FIG. 5*c*) of the same type as in the method described here above. If necessary, this layer of bonder may be printed with securitizing information or patterns and figures (FIG. 5*d*).

Figure 5E:
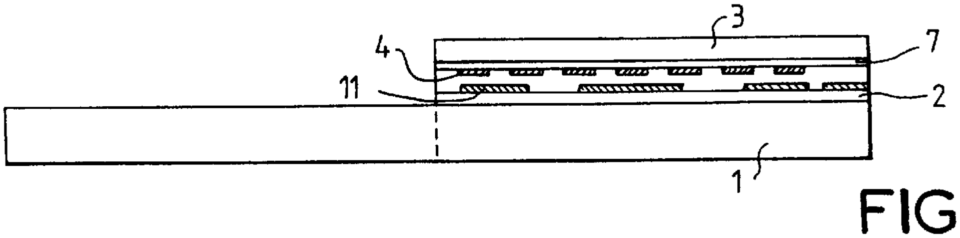

The information transfer sheet 4 is applied by its face bearing the information 4 to the face 10 of the document 1 (FIG. 5*e*).

As in the case described with reference to FIG. 1*d*, the face 30 of the sheet 3 is pressed against the face 10 with or without heat depending on whether the bonder 2 is a hot bonder or a bonder at ambient temperature.

The personalizing information thus merges with the layer of bonder.

Figure 5F:
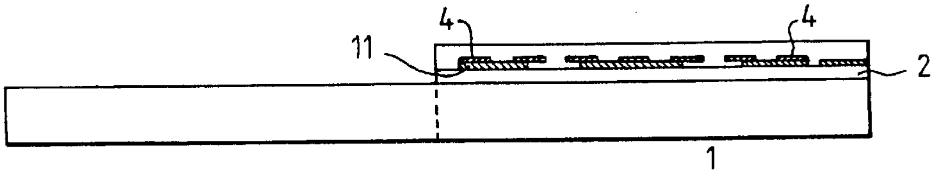
Figure 5G:
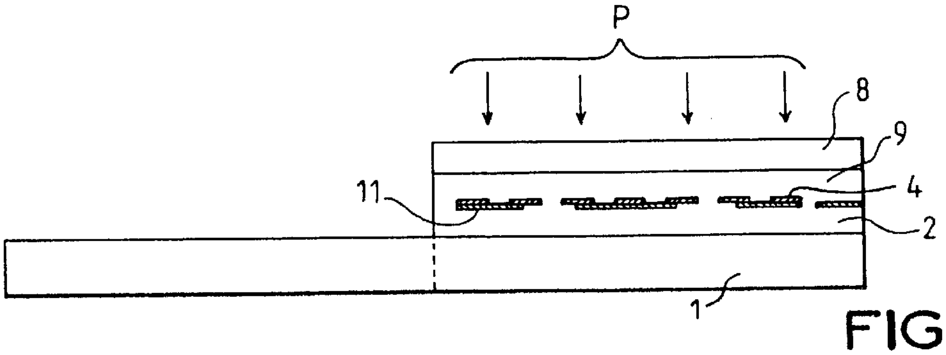

Then, the information transfer sheet 3 is removed. This is possible owing to the presence of the adhesive-proof layer 7 (FIG. 5*f*).

Indeed, the clinging of the pigments of information is then greater on the document 1 (made of paper).

To secure the information elements, it is then possible to apply a transparent film (FIG. 5*g*) to the document. As is known in the prior art, the passport may be provided with a transparent security film 8 (stitched, stapled or bonded on the spine of the passport). This security film is covered with a layer of hot bonder 9 or bonder at ambient temperature (cold). In the case of hot bonder, the bonding is done by heat-sealing. In the case of bonding at ambient temperature, all that is necessary is to remove the sheet protecting the bonder and apply the security film to the face bearing the information 10. The information printed in the layer of bonder 4 is then coated with a second layer of bonder 9 and with the security film 8

The approach which consists in providing for hot bonder on the document, printing security information or patterns and figures, transferring the personalizing information elements to this same layer of bonder and then merging them under heat provides maximum security against all attempts at falsification, for the security information and the personalizing information form a whole in the layer of bonder.

Any removal of the security film leads to the removal of the layer of bonder 4 as well as the information that it contains. It is this entire complex that is detached from the paper, thus making it possible to reveal any attempt at falsification. The fact that, when the film is removed, the protective background (the security information) is lost at the same time as the personalizing information prevents the reusing of the protective film.

The invention thus provides a complete solution to the protection of personalizing information and thwarts the various methods of falsification known to date.

Here above, the personalizing information has been printed in mirror mode (geometrical reversal) on the information transfer film.

In the method of FIGS. 5*a* to 5*g*, the transfer sheet 3 may be a sheet of paper or plastic treated on the surface with a non-adhesive compound which may be silicone or any other product having the same properties.

The approach that consists in printing the layer of hot bonder 2 along with a printing of a security foundation provides optimum security to the data transferred. It is thus possible to mix iridescent or fluorescent pigments or any other security elements with the adhesive in such a way that the adhesive has properties of authentication and so that its substitution can be easily detected.

What is claimed is:

1. A method for making a document comprising the steps of:

preparing a layer of bonder on at least one face of the document;

printing on the layer of bonder at least one of security information, drawings and patterns after preparing the layer of bonder on the face of the document;

preparing an adhesive-proof layer on a first face-of an information transfer sheet;

printing on the adhesive-proof layer in a mirror mode at least one of information elements and images after the preparing of the adhesive-proof layer on the first face of the information transfer sheet; and bonding the first face of the information transfer sheet to the layer of bonder on the face of the document.

2. A method according to claim 1, wherein the layer of bonder is in the solid state at ambient temperature, and further composing the steps of:

bonding the face of the information transfer sheet to the layer of bonder on the face of the document; and raising the temperature of the bonder so that it achieves the bonding of the face of the information transfer sheet to the face of the document.

3. A method according to claim 1, wherein the layer of bonder has bonding quality at ambient temperature and a protective sheet is provided on the layer of bonder, and further comprising the step of removing the protective sheet before bonding the face of the information transfer sheet to the layer of bonder.

4. A method according to any one of claims 1 to 3, wherein the information transfer sheet is transparent.

5. A method according to claim 4, further comprising the steps of:

bonding the information transfer sheet by its second face, opposite the first face of the information transfer sheet; and removing a backing sheet after the bonding of the first face of the information transfer sheet to the layer of bonder on the face of the document.

6. A method according to any one of claims 1 to 3, further comprising the step of withdrawing the information transfer sheet after the bonding of the first face of the information transfer sheet to the layer of bonder on the face of the document.

7. A method according to claim 6, further comprising the steps of:

removing the information transfer sheet, and bonding a transparent protective sheet to the face of the document bearing at least one of the information elements and images.

8. A method according to claim 7, wherein the protective sheet comprises a layer of cold bonder.

9. A method according to claim 7, wherein the protective sheet comprises a layer of hot bonder and wherein the bonding of this sheet to said face of the document is done by heat-sealing.

10. A method according to claim 9, wherein the face of the document comprises at least one of security information, patterns and figures.

11. A method according to claim 1, wherein the document is a first page of a booklet and wherein a second page designed to get closed on to this first page is covered with an adhesive-proof layer.

12. A method according to claim 11, wherein the adhesive-proof layer is made of silicone.

13. A method according to claim 5, wherein the backing sheet is made of at least one of plastic, polyester, PVC and polycarbonate.

14. A method according to claim 4, further comprising the step of coating the first face of the information transfer sheet with a layer of gelatin before printing of at least one of the information elements and images.

15. A method according to claim 6, further comprising the step of making the adhesive-proof layer of silicone.

16. A method according to claim 6, further comprising the step of coating the layer of bonder bearing the information elements and images with a second layer of bonder.

17. A method according to claim 16, further comprising the step of coating the second layer of bonder with a security film.

* * * * *